Figure 1:
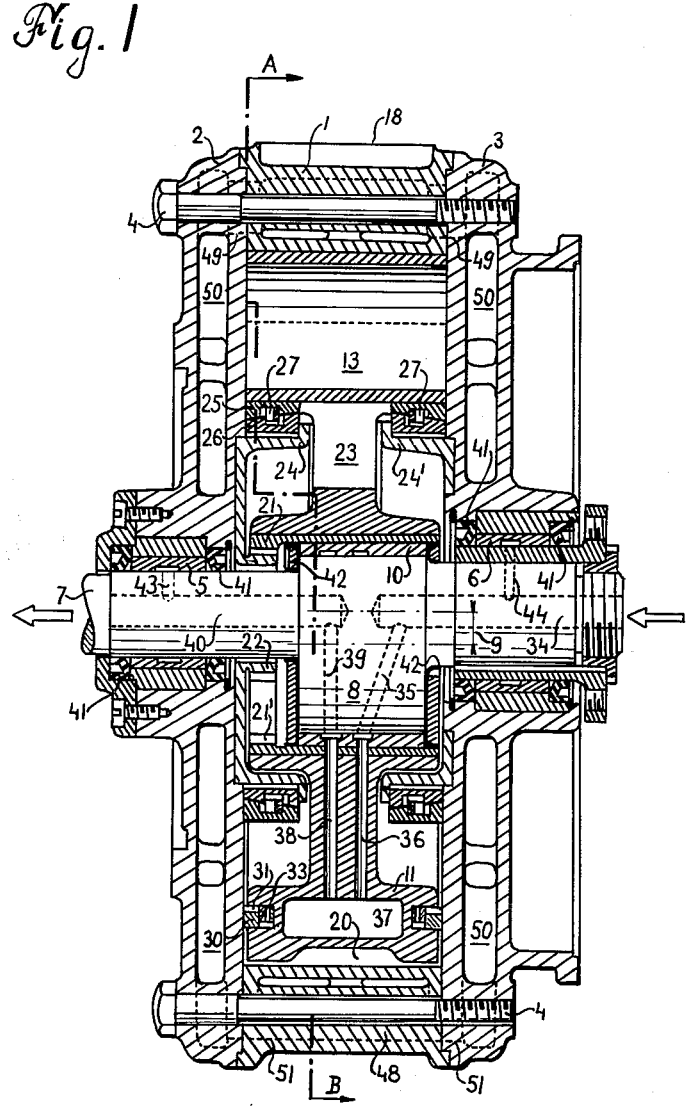

Oct. 26, 1965     K. VENYGR     3,213,801
ROTARY ENGINE

Filed Feb. 10, 1965     2 Sheets-Sheet 1

INVENTOR.
Karel Venygr
BY
Richard Low
Ag't

United States Patent Office 3,213,801
Patented Oct. 26, 1965

3,213,801
ROTARY ENGINE
Karel Venygr, Prague, Czechoslovakia, assignor to Ustav pro vyzkum motorovych vozidel, Prague, Czechoslovakia
Filed Feb. 10, 1965, Ser. No. 431,566
Claims priority, application Czechoslovakia, Feb. 27, 1964, 1,114/64
10 Claims. (Cl. 103—136)

This invention relates to rotary engines, and particularly to rotary internal combustion engines and similar apparatus in which energy is transmitted from a fluid to a rotating machine element.

The invention is more specifically concerned with engines of the type in which a rotor gyrates eccentrically in the cavity of a stator, the terms rotor and stator not necessarily being indicative of movement or non-movement of the element so referred-to relative to its environment. Rotor and stator define an annular space in the stator cavity, and this space is divided into circumferentially offset compartments by sealing members which move with the rotor and sealingly engage the stator. The rotor is movably mounted on the outer cylindrical face of an eccentric fixedly attached to a shaft which is journaled in the stator casing. The rotor is connected by gears either to the stator or to the shaft so that the movements of the rotor about the axis of the eccentric, and the movement of the latter about the axis of the shaft are uniquely correlated.

Efficient operation of the afore-described apparatus is predicated on good sealing connections between the sealing members and the inner casing wall, and between the sealing members and the rotor. The sealing members move circumferentially relative to the casing wall during operation of the engine, and they move relative to the rotor in a direction which has a predominant radial component as the several compartments are increased and decreased in radial size during relative movement of rotor and stator.

It is difficult to maintain the necessary tight sealing engagement under the conditions of high temperature and high pressure differentials under which the sealing members frequently operate, particularly in rotary internal combustion engines. Seizing and wear reduce the useful life of conventional sealing members, and vibration of the members at resonant frequencies causes grooving of the internal casing walls. When the walls have to be made of case hardened steel or other material resistant to grooving, mass production of the engines becomes difficult.

Sealing members which do not slide along the inner casing wall, but roll along the wall are free from many of the shortcomings of the known devices, and it is an important object of this invention to provide an engine of the type described with rolling sealing members which are capable of operating at high pressure differential between the two compartments separated by the member. Another object is the provision of a sealing arrangement in which the unavoidable thermal expansion and contraction of the rolling members and their normal wear are automatically compensated for. It will be appreciated that the wear of a rolling element is inherently lower than that of a sliding element under otherwise identical conditions. Wear is further reduced by the more uniform temperature that can be maintained in a rotating sealing member as compared to one in which a narrow contact face is subjected to continuous concentrated frictional heat.

With these objects and others in view, the invention in one of its aspects resides in a rotary engine which has track means mounted in the casing cavity about the axis of the casing, hereinafter referred to as the first axis. An inner wall of the casing extends about this axis in a closed arc, and the track defined by the track means is spacedly parallel to the arc. The rotor of the engine gyrates in the casing cavity about a second axis, and a plurality of sealing members is interposed between the track and the inner casing wall in sealing engagement with the latter.

Engaging means are provided on the rotor in sealing engagement with the sealing members for moving the sealing members about the first axis in simultaneous engagement with the track and with the inner rotor wall when the rotor gyrates about the second axis. The sealing members divide an annular space between rotor and casing into a corresponding plurality of circumferentially offset compartments.

Figure 2:
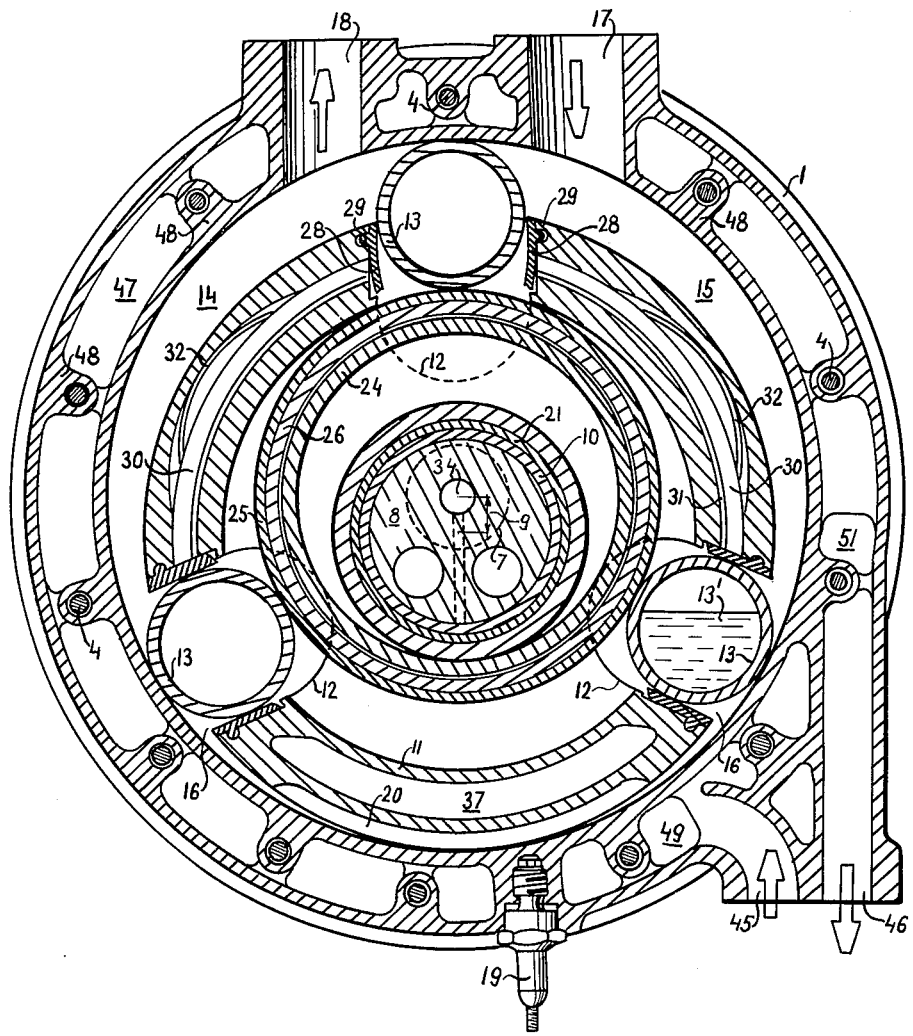

Other features and many advantages of this invention will be readily appreciated as the same becomes better understood by reference to the following detailed description of a preferred embodiment when considered in connection with the accompanying drawing wherein:

FIG. 1 shows a rotary internal combustion engine of the invention in axial section; and FIG. 2 shows the engine of FIG. 1 in radial section on the line A–B.

Referring now to the drawing in detail, the stator or casing of the illustrated engine mainly consists of a short tubular member 1 having a generally cylindrical inner wall about the casing cavity, and of two end walls 2, 3 which close the two axial ends of the cavity. Screws 4 hold the end walls 2, 3 in place on the tubular member 1. Bearings 5, 6 in the end walls 2, 3 rotatably receive the engine shaft 7 for rotation about the common axis of the casing and the shaft (first axis). An integral eccentric 8 of cylindrical shape is arranged on the shaft 7 in the casing cavity. The radial spacing between the first axis and the parallel geometrical axis of the eccentric (second axis) is indicated by double arrows 9.

The rotor mainly consists of a hub portion which includes a bearing bushing 10 in sliding contact with the cylindrical face of the eccentric 8, and a sleeve 21; an annular rim portion 11; and webs 23 which connect the hub and rim portions.

The rim portion 11 has three notches 12 which are open in a radially outward direction and are dimensioned to receive respective cylindrical hollow sealing members 13. When in rolling contact with the inner wall of the casing member 1, as shown in FIG. 2, the sealing members 13 divide the annular space between the rim portion 11 and the casing member 1 into three circumferentially offset compartments 14, 15, 16.

An intake port 17 and an exhaust port 18 are arranged closely adjacent each other in the casing member 1, and a spark plug 19 is arranged approximately diametrically opposite the exhaust port 18. Each portion of the generally cylindrically outer face of the rim 11 between two circumferentially adjacent notches 12 is centrally recessed to provide a combustion chamber 20.

Reverting now to FIG. 1, it is seen that the sleeve 21 extends axially beyond the bushing 10 and the eccentric 8, and that the projecting portion carries an internal ring gear 21'. The outer perimeters of two annular disks 24, 24' respectively fixedly and coaxially fastened to the end walls 2, 3 carry integral flanges which project axially toward each other. Another integral flange 22 at the inner perimeter of the disk 24 is externally toothed to provide a stationary pinion which meshes with the ring gear 21' when the roter gyrates on the eccentric 8 about the second axis while the eccentric itself rotates about the first axis. The gear ratio of the ring gear 21' and of the pinion 22 is 3:2. As is known in itself, such an arrangement causes the rotor to make one revolution about the second axis while the shaft 7 rotates three times about the first axis.

The gap between the projecting flanges at the outer perimeters of the disks 24, 24' is dimensioned for free movement of the webs 23. Pairs of rings 25, 26 are rotatably held on the outer flange of each disk 24, 24'. The outer ring 25 of each pair envelops the inner ring 26. Their contact faces are conical about the first axis, and a corrugated annular leaf spring 27 which is accommodated in corresponding recesses in the contact faces tends to shift the outer ring 25 axially relative to the inner ring 26 in such a manner that the outer ring is expanded by the camming cooperation of the contact faces. As seen in FIG. 2, the inner ring 26 extends in a continuous circle about the first axis, whereas the outer ring 25 is split, and thus capable of expansion. The cylindrical outer faces of the rings 25 are parallel to and opposite the cylindrical inner wall of the casing member 1 and provide an inner track for the sealing members 13 in the notches 12. Because of the tendency of the rings 25 to expand radially outward under the urging of the springs 27, thermal shrinkage of the sealing members 13 and their wear are compensated for. When the sealing members 13 thermally expand, the rings 25 are compressed against the restraint of the springs 27.

As shown with respect to one of the sealing members 13 in FIG. 2, the cavity in each member may be partly filled with a movable ballast 13', preferably sodium, which is liquid at the operating temperature of the engine and enhances uniform temperature distribution in the member. The weight of the ballast increases the centrifugal forces which tend to hold the sealing member in engagement with the internal wall of the casing member 1 on which it rolls during engine operation, and counteracts the gas pressure in adjacent compartments which tends to lift the sealing member from the casing wall. The sealing members 13 may be axially open, as shown in FIG. 1 when not partly filled with sodium. The quality of the seal formed between each member 13 and the end walls 2, 3 is not overly critical, and clearances consistent with very good machine shop parctice are satisfactory.

The effects of thermal expansion and contraction and of sealing member wear on the sealing engagement between the members 13 and the rim portion 11 of the rotor are compensated for by sealing plates 28 which line the radial walls of the notches 12. An approximately semicylindrical rib 29 on the back of each plate near its outer end is fixedly received in a carresponing axially elongated groove of the rim portion 11 in a radial wall of the notch 12, and thus prevents radial movement of the plate 28. The radially inner end of the plate is resiliently movable inward of the associated notch 12 to a small extent, and is urged into the notch by one of six bars 30. The bars are arcuately bent and are movably received in oversized arcuate grooves 31 on both sides of the rotor rim portion 11, each bar being longitudinally interposed between two notches 12.

Leaf springs 32 in the grooves 31 urge the bars 30 radially inward, and thereby cause the ends of each bar to exert pressure on the two associated plates 28. To prevent gas leakage along the grooves 31 between the several compartments 14, 15, 16, members 33, which each have the shape of a segment of a short, hollow cylinder, and corrugated springs (not shown) are arranged in the grooves 31 in such a manner as to hold the bars 30 in sealing contact with the end walls 2, 3 and the members 33 while the latter seal the grooves under the external gas pressure which forces them against the inner walls of the grooves.

The pressure lubrication system which supplies an oil film between the outer flanges on the disks 24, 24' and the inner rings 26 has not been illustrated, and may be entirely conventional. Lubricant is transferred by the rings 25, 26 to the frontal and cylindrical surfaces of the sealing members 13 and from there to the plates 28 by the normal operation of the engine. The conduits which provide oil mainly for cooling purposes to the rotor, the walls of the stator cavity, and other elements of the engine subjected to high temperature are illustrated in some detail.

Oil is fed through an axial bore 34 into one end of the shaft 7. A duct 35 communicating with the bore 34 has an orifice in the cylindrical face of the eccentric 8, and is axially aligned with an annular groove in the inner face of the bearing bushing 10. A radial duct 36 leads outward from the annular groove through each web 23 to a chamber 37 in the associated segment of the rim portion 11. The oil is returned from the chamber 37 through a radial duct 38 to an annular groove in the bearing bushing 10, and thence through a duct 39 in the eccentric 8 to another axial bore 40 in the other end of the shaft 7 from which it is returned to a cooler and a circulating pump (not shown).

The bearing 5, 6 are connected with the bores 34, 40 by respective radial passages 43, 44, and are outwardly sealed by rubber gaskets 41 and metal gaskets 42.

The stator is provided with cooling fluid through a separate circuit which extends between an intake pipe 45 and a discharge pipe 46. The fresh cooling liquid enters the jacket 47 in the hollow casing member 1 near the spark plug 19 in the area of highest temperature. Mounting lugs 48 on the inner and outer walls of the casing member 1 are connected by the screws 4 and form a system of baffles in the jacket 47. Communicating passages 49 in the cylindrical casing member 1 and the end walls 3, 4 connect the jacket 47 with similar jackets 50 in the end walls in which internal ribs of the walls control the flow of coolant from hotter to cooler wall sections. The cooling fluid ultimately returns to the jacket 47 through passages 51 diametrically opposite the passages 49 and is discharged through the pipe 46.

It will be understood that the engine is normally equipped with counterweights for balancing the eccentrically mounted rotor. Such counterweights are known in themselves, and have been omitted for the sake of clarity.

If operated at adequate compression ratio, the four stroke cycle engine illustrated may be operated by compression ignition in the manner of a diesel engine, and the spark plug 19 is replaced by a fuel injector.

Other modifications and variations of the present invention are possible in the light of the above teachings. It is therefore to be understood that, within the scope of the appended claims, the invention may be practiced otherwise than as specifically described.

What is claimed is:
1. A rotary engine comprising, in combination:
 (a) a casing having a first axis and an inner wall extending about said axis in a closed arc, said wall radially enclosing a cavity in said casing;
 (b) track means in said cavity, said track means including
  (1) a track member fixedly mounted on said casing and extending about said first axis,
  (2) an expandable ring member mounted on said track member for circumferential movement about said first axis, and
  (3) pressure means urging said ring member to expand radially outward toward said wall, an outer face of said ring member opposite said wall constituting a track spacedly parallel to said arc;
 (c) a rotor mounted in said cavity for gyration about a second axis spaced from said first axis, and extending in a common direction therewith, said rotor and said inner wall defining therebetween an an- nular space in said cavity, the width of said space varying in a circumferential direction;

(d) a plurality of circumferentially spaced sealing members interposed between said track and said inner wall in sealing engagement with said inner wall;

(e) engaging means on said rotor in sealing engagement with said sealing members for moving the sealing members about said first axis in simultaneous engagement with said track and with said inner wall when said rotor gyrates about said second axis, whereby said sealing members divide said space into a plurality of circumferentially offset compartments;

(f) intake means for admitting fuel to said compartments;

(g) ignition means for igniting the fuel in said compartments; and (h) exhaust means for discharging the spent fuel.

2. A rotary engine comprising, in combination:
(a) a casing having a first axis, an inner wall extending about said axis in a closed arc, said inner wall radially enclosing a cavity in said casing, and two end walls closing respective axial ends of said cavity;
(b) two track means respectively mounted on said end walls in said cavity, each track means including
 (1) a track member fixedly mounted on the respective end wall and projecting therefrom into said cavity, said track member extending about said first axis,
 (2) an expandable ring member mounted on said track member for circumferential movement about said first axis, and
 (3) pressure means urging said ring member to expand radially outward toward said inner wall, an outer face of said ring member opposite said inner wall constituting a track spacedly parallel to said arc;
(c) a rotor mounted in said cavity for gyration about a second axis spaced from said first axis and extending in a common direction therewith
 (1) said rotor having a central hub portion about said second axis, a peripheral rim portion spaced from said hub portion toward said inner wall, and rib means connecting said hub portion and rim portion,
 (2) said rim portion and said inner wall defining therebetween an annular space in said cavity, the width of said space varying in a circumferential direction,
 (3) said track members being axially spaced from each other a distance greater than the axial width of said rib means;
(d) a plurality of circumferentially spaced sealing members interposed between said track and said inner wall in rolling contact with the same and in sealing engagement with said inner wall; and
(e) engaging means on said rotor in sealing engagement with said sealing members for moving the sealing members about said first axis in simultaneous engagement with said track and with said inner wall when said rotor gyrates about said second axis, whereby said sealing members divide said space into a plurality of circumferentially offset chambers.

3. A rotary engine comprising, in combination:
(a) a casing having a first axis, an inner wall extending about said axis in a closed arc, said wall radially enclosing a cavity in said casing, and an end wall axially closing said cavity;
(b) track means in said cavity including
 (1) a track member fixedly fastened to said end wall and having an outer face of circular cross section about said first axis,
 (2) a first ring member rotatably mounted on said outer face,
 (3) a second radially expandable ring member, said ring members having respective engaged conical annular cam faces, and said second ring member having an outer face opposite said inner wall and constituting a track, and
 (4) yieldably resilient means urging said cam faces of said ring members to move relative to each other for expanding said second ring member;
(c) a rotor mounted in said cavity for gyration about a second axis spaced from said first axis, and extending in a common direction therewith, said rotor and said inner wall defining therebetween an annular space in said cavity, the width of said space varying in a circumferential direction;
(d) a plurality of circumferentially spaced sealing members interposed between said track and said inner wall in sealing engagement with said inner wall; and
(e) engaging means on said rotor in sealing engagement with said sealing members for moving the sealing members about said first axis in simultaneous engagement with said track and with said inner wall when said rotor gyrates about said second axis, whereby said sealing members divide said space into a plurality of circumferentially offset compartments.

4. An engine as set forth in claim 1, wherein said casing includes an end wall closing an axial end of said cavity, and said track member is fixedly mounted on said end wall.

5. An engine as set forth in claim 4, wherein said arc is substantially circular.

6. An engine as set forth in claim 1, wherein said sealing members are of circular cross section about respective axes extending in said common direction and are rotatably received in respective radially open recesses of said rotor.

7. An engine as set forth in claim 6, wherein said sealing members are hollow.

8. An engine as set forth in claim 7, further comprising ballast means movable in said hollow sealing members.

9. An engine as set forth in claim 1, further comprising a shaft mounted in said casing for rotation about said first axis; a first gear on one of said end walls centered on said first axis; a second gear on said hub portion centered on said second axis and in meshing engagement with said first gear; and an eccentric fixedly fastened to said shaft and carrying said rotor for rotation thereof about said second axis, said second axis being fixed relative to said eccentric.

10. An engine as set forth in claim 1, wherein said engaging means include a sealing plate associated with each sealing member and sealingly mounted on said rotor, and yieldably resilient means for urging the sealing plate into engagement with the associated sealing member.

References Cited by the Examiner

UNITED STATES PATENTS

| | | | |
|---|---|---|---|
| 556,721 | 3/96 | Briggs | 103—136 |
| 1,265,070 | 5/18 | Feyzes | 103—136 |
| 1,686,569 | 10/28 | McMillan | 123—8 |
| 2,484,993 | 10/49 | Gruber | 103—136 |
| 2,586,964 | 2/52 | Kraissl | 103—136 |
| 3,042,009 | 7/62 | Froede et al. | 123—8 |

DONLEY J. STOCKING, *Primary Examiner.*

KARL J. ALBRECHT, *Examiner.*